(No Model.)
W. LEWIS.
MACHINERY FOR TRANSMITTING AND ARRESTING MOTION.
No. 421,178. Patented Feb. 11, 1890.
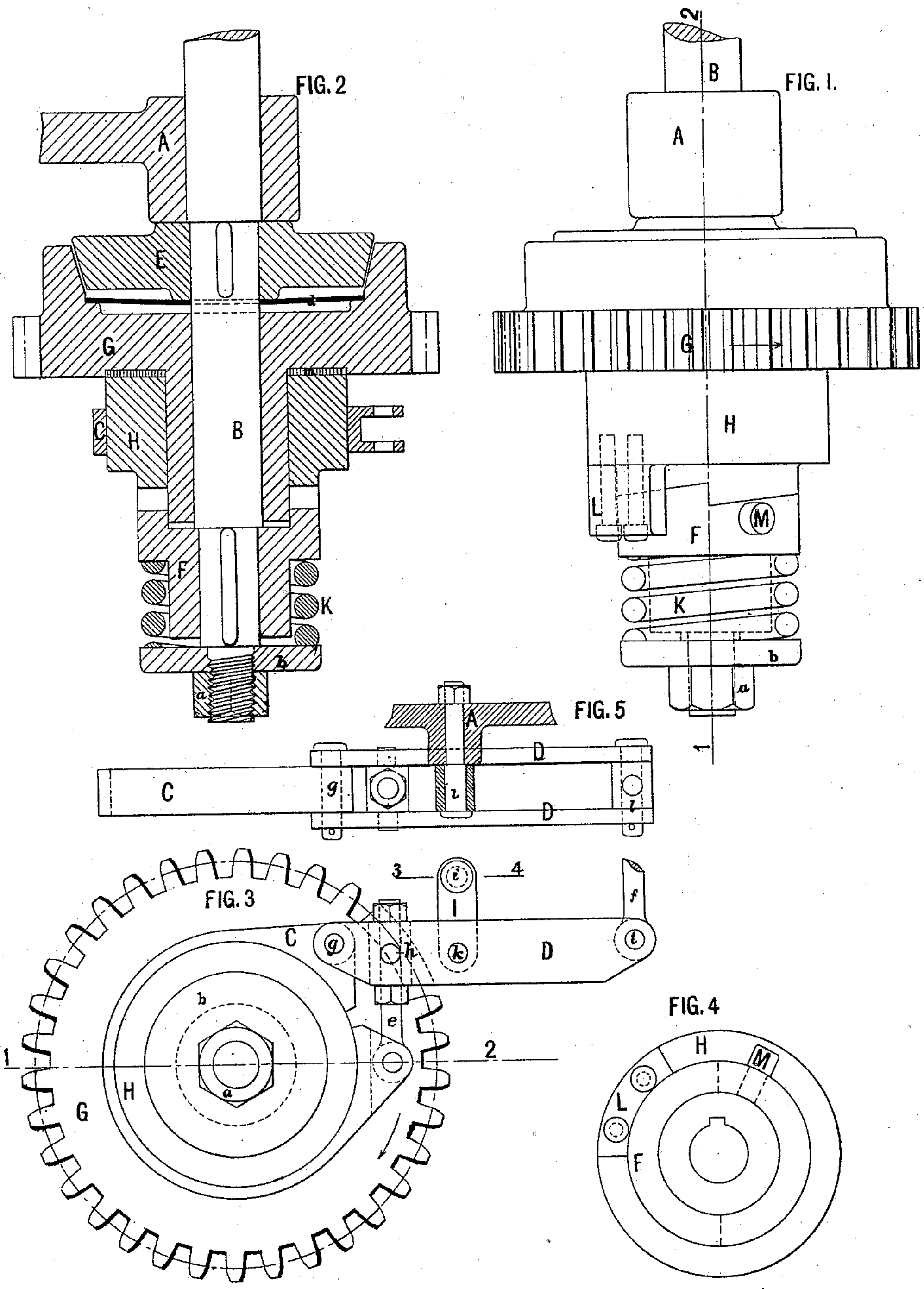
WITNESSES
John L. Phillips
Edw. K. Harper
INVENTOR
Wilfred Lewis.
N. PETERS, Photo-Lithographer, Washington, D. C.

UNITED STATES PATENT OFFICE.

WILFRED LEWIS, OF PHILADELPHIA, PENNSYLVANIA, ASSIGNOR TO THE WILLIAM SELLERS & COMPANY, INCORPORATED, OF SAME PLACE.

MACHINERY FOR TRANSMITTING AND ARRESTING MOTION.

SPECIFICATION forming part of Letters Patent No. 421,178, dated February 11, 1890.

Application filed January 23, 1889. Serial No. 297,301. (No model.)

*To all whom it may concern:*

Be it known that I, WILFRED LEWIS, of the city and county of Philadelphia and State of Pennsylvania, have invented certain new and useful Improvements in Machinery for Transmitting and Arresting Motion, of which improvements the following is a specification.

My present invention relates to that class of machinery in which a train of gearing is required to be operated or driven intermittently by another train which operates continuously, for which purpose Letters Patent No. 352,623, dated November 16, 1886, have already been granted me. The device shown and described in that patent transmits motion with as much certainty as a toothed clutch, and the shock of starting is so far relieved that under ordinary conditions it engages or releases the driven train without any apparent shock or jar; but as the work of starting and stopping this train becomes greater with increased speed or with increased weight, the strength of the parts may be severely taxed in exceptional cases unless provision is made to relieve the strain upon them.

It is therefore an object of my present invention to start the driven train more gradually than is possible with the devices shown and described in my before-mentioned patent.

It is a further object of my invention to definitely fix and determine a limit for the driving pressure on the friction-clutches; and to these ends my invention consists in the introduction of an abutment-spring which by its yielding permits the driving-clutch to slip in starting.

It further consists in the combination, with an abutment-spring, of a stop on the engaging member of the driven train, by which its angular motion in tightening is limited in relation to other parts of the driven train.

In the accompanying drawings, which form part of this specification, Figure 1 is an outside view or elevation. Fig. 2 is a section on the lines 1 2, Figs. 1 and 3. Fig. 3 is an end elevation, showing also a brake for controlling the action of the driving upon the driven train. Fig. 4 is also an end elevation showing particularly the stops by which the angular movement of the engaging member may be limited. Fig. 5 is a plan of the brake preferably used for engaging or disengaging the driven train, the supporting-frame and link being shown in section on the line 3 4, Fig. 3.

A is a stand forming a bearing for the shaft B and a support for the link I of the brake C.

G is the driving-wheel, running continuously in the direction indicated by the arrow.

E is the driving-abutment, and F the tightening-abutment, both keyed to the shaft B.

H is the engaging frictional member, controlled by the brake C.

K is a spring which is compressible between the washer *b* and a shoulder on the tightening-abutment F.

*m* is a ring of leather or other material giving the necessary friction to turn H on F in tightening.

*d* is a plate-spring under sufficient strain to keep G and H in contact with *m* and separate G and E when out of action.

To one end of the brake-strap C the links D D are attached by the pin *g*. The bolt *e* is attached to the other end of the brake-strap and connects with the links D D through the trunnion-block *h*. The link I supports the links D D by the pin *k* from the pin *i* in the stand A, and the brake is tightened or loosened in its grip upon H by the rod *f* and pin *l*. Raising the rod *f* tightens the brake, and depressing it loosens it again. When the brake is loosened, the friction of *m* carries the engaging member H around on F, driving G against E and forcing F back toward *b*, compressing the spring K. While K is being compressed G slips around on E, and the shock in starting is thereby relieved; but when K has reached its limit of compression by the lateral contact of its spirals with each other and against *b*, or when F comes against *b*, no further slip can take place, and the drive is positive. The compression of the spring K will produce the necessary friction for driving if the spring is sufficiently stiff. When the driven train has acquired the necessary speed, any additional power will be obtained with the further compression of the spring until F compresses the spring K to its limits against *b*, when the drive will be positive; or the spring may be stiffer and arranged to move through a greater distance, so as to reach a degree of compression capable of performing all of the work without attaining the positive condition produced by the lateral contact of its spirals when compressed between F and *b*. To accomplish this it may be necessary to provide a greater angular motion than is afforded by the spiral end contact of H and F, which can be obtained by screwing F into H, as shown in my before-mentioned patent, No. 352,623. When the brake is tightened, H is checked and the grip on the friction-surfaces of G, H, and E is released by unscrewing the helical cam-faces of H and F. H and F come together on their notched faces, and H is carried forward under the friction of the brake by the inertia of the driven train. Thus the shock in starting is relieved by the abutment-spring K and the shock in stopping by the brake C. When the inertia of the driven train becomes very great, it may be difficult to start in this way before the tightening-abutment F compresses the spring K to its limit against the washer *b*, making the drive positive, and to prevent such an accident as might result from the strain thus put upon the shaft B the lugs L and M are introduced. The lug L is attached to the engaging member H and the lug M to the tightening-abutment F, so that L will stop against M before F compresses the spring K to its limit against the washer *b*. In this manner the pressure on the friction-surfaces of H, G, and E is limited by the elastic force of the spring K, and under this limited pressure the driving-wheel G may slip against H and E until the inertia of the driven train is absorbed. It is not necessary that the spring K shall be located exactly as shown. With slight alteration in the design it could be made to act against the driving-abutment E; or, as shown in my previous specification, the shaft B might be arranged as the driver and a spring introduced with like effect.

Having now described my invention, what I claim as new, and desire to secure by Letters Patent, is—

1. In machinery for transmitting and arresting motion, an engaging frictional member and an abutment-spring compressible by this engaging member, in combination with the frictional members of the driving and driven trains, substantially as described.

2. In machinery for transmitting and arresting motion, an engaging frictional member, an abutment-spring compressible by this engaging member, and frictional members of the driving and driven trains, substantially as described, in combination with a friction-brake, for the purpose specified.

3. In machinery for transmitting and arresting motion, an engaging frictional member, an abutment-spring compressible by this engaging member, and a friction-brake, in combination with a stop which determines the angular motion between the engaging member and the tightening-abutment, substantially as described.

WILFRED LEWIS.

Witnesses:
JOHN L. PHILLIPS,
EDW. R. HARPER.